United States Patent [19]
Yamamoto

[11] Patent Number: 5,835,819
[45] Date of Patent: Nov. 10, 1998

[54] IMAGE FORMING METHOD FOR PROVIDING NON-EXPOSURE AREA BETWEEN ADJACENT DIFFERENT CONTRAST IMAGES

[75] Inventor: Takeshi Yamamoto, Yokohama, Japan

[73] Assignee: Canon Kabushiki Kaisha, Tokyo, Japan

[21] Appl. No.: 997,811

[22] Filed: Dec. 24, 1997

[30] Foreign Application Priority Data

Dec. 28, 1996 [JP] Japan ..................................... 8-358664

[51] Int. Cl.[6] .................................................. G03G 15/043
[52] U.S. Cl. ............................................. 399/51; 347/121
[58] Field of Search ............................... 399/51, 52, 181, 399/187; 347/112, 129

[56] References Cited

U.S. PATENT DOCUMENTS 4,244,647  1/1981  Fujiwara et al. ..................... 399/187 X
4,537,490  8/1985  Stoudt ................................. 399/181 X Primary Examiner—S. Lee
Attorney, Agent, or Firm—Fitzpatrick, Cella, Harper & Scinto

[57] ABSTRACT

An image forming method having the steps of charging a photosensitive member, forming an electrostatic latent image on the charged photosensitive member by image exposure, providing a nonexposure area in an image border portion when images having different contrast are formed adjacent to each other, and developing the electrostatic latent image on the photosensitive member.

8 Claims, 14 Drawing Sheets

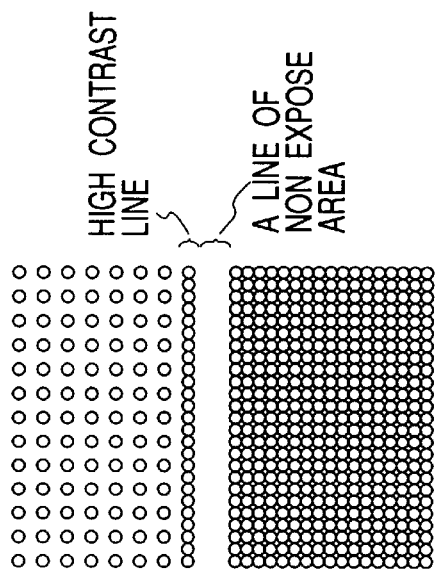
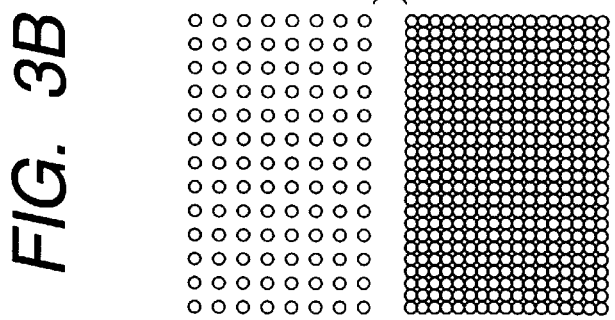
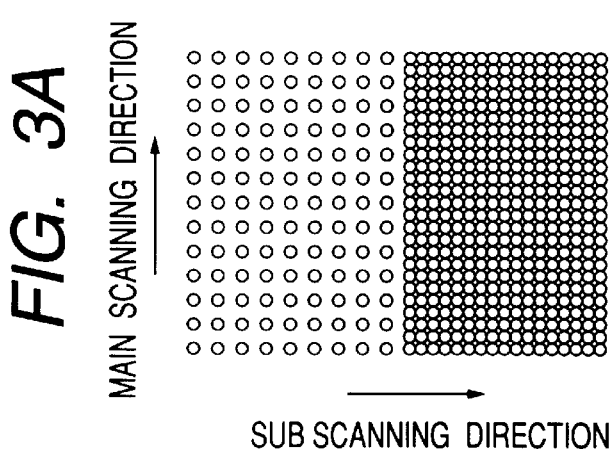

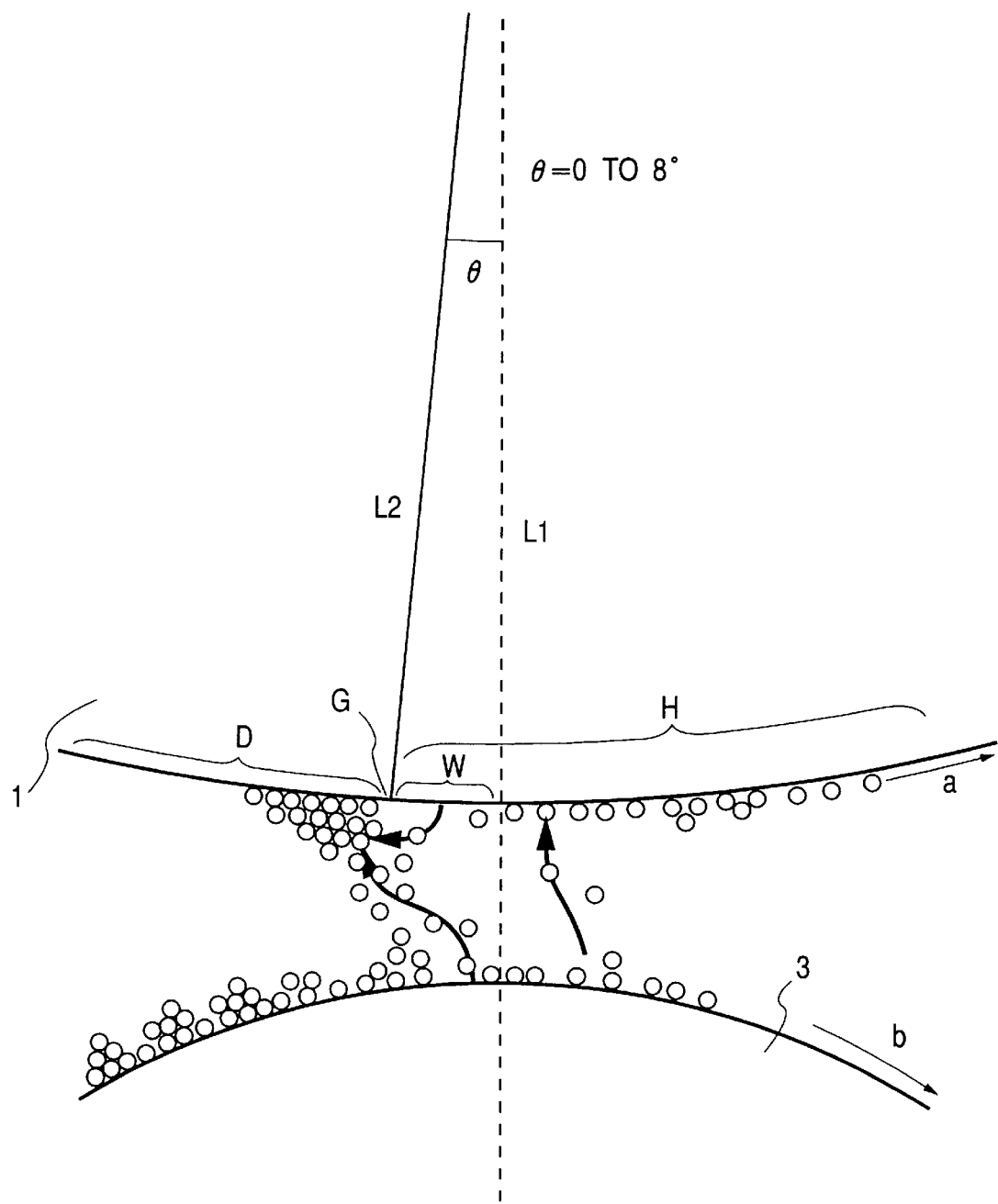

IMAGE FORMING METHOD FOR PROVIDING NON-EXPOSURE AREA BETWEEN ADJACENT DIFFERENT CONTRAST IMAGES

BACKGROUND OF THE INVENTION

1. Field of the Invention

The present invention relates to an electrophotographic image forming apparatus such as a copying machine, a printer and the like.

2. Related Background Art

In conventional image forming apparatuses of the electrophotographic type such as electrophotographic copying machines, electrophotographic laser beam printers and the like, an electrostatic latent image is formed on a surface of an image bearing member and then the latent image is developed with toner to form a toner image (visualized image) which is in turn transferred onto a transfer material (for example, a paper sheet) to obtain an image.

In the above-mentioned development, generally, a one-component developing method using a one-component developer comprised of toner is advantageous in comparison with a two-component developing method using a two-component developer comprised of magnetic particles (carrier) and toner, because a structure of a developing device becomes simpler and maintenance can be effected more easily. Thus, various one-component developing methods and devices have been proposed.

FIG. 14 shows an example of a one-component developing device. In the developing device 2 shown in FIG. 14, a cylindrical nonmagnetic developing sleeve 3 is used as a toner bearing member, and a one-component magnetic toner T contained in a toner container 5 is held on the developing sleeve 3 by a magnetic force of a magnet roller 4 fixed within the developing sleeve 3. By rotating the developing sleeve 3 in a direction shown by the arrow b in FIG. 14, the magnetic toner T is moved, and a thin toner layer is formed on the developing sleeve 3 by a concentrated magnetic field generated between a magnetic blade 6 and a magnetic pole N1 of the magnet roller 4. The developing sleeve 3 on which the thin toner layer T was formed is opposed to a photosensitive drum 1 with a gap of 50 to 500 $\mu$m. Since a developing bias obtained by overlapping a DC voltage with an AC voltage is applied between the developing sleeve 3 and the photosensitive drum 1 from a bias power source 7, the toner T is flying toward and adhered to the electrostatic latent image on the photosensitive drum 1, thereby effecting so-called jumping development.

The above-mentioned developing device 2 serves to form a monocolor toner image. However, recently, developing methods for forming a color image by using non-magnetic color toner as the developer have been practically used.

The photosensitive drum 1 in FIG. 14 is constituted by a drum substrate 1a and a photosensitive layer 1b coated on the drum substrate and is rotated in a direction shown by the arrow a by a drive means (not shown). The magnet roller 4 has magnet poles N1, S1, N2 and S2 arranged in order along a rotational direction of the developing sleeve 3.

However, in the above-mentioned conventional developing method and device, when images having different contrast are positioned adjacent to each other (for example, as shown in FIG. 5, when a half tone portion H is positioned adjacent to a solid portion D), in an image border portion G between the image portions (referred to merely as "border portion" hereinafter), a white void area having a white void zone of several millimeters is frequently generated at the half tone side. This phenomenon greatly depends upon an edge effect at the border portion G of the latent image and, as shown in FIG. 6, such phenomenon is generated when the toner at the half tone portion H side in the border portion G is transferred toward the solid portion D side having greater contrast. To observe the edge effect in detail, FIG. 7 shows a distribution of electric field vectors and potentials in a developing nip between the photosensitive drum 1 and the developing sleeve 3. In FIG. 7, "H" indicates the half tone portion, "D" indicates the solid portion and "G" indicates the border portion between the portions H and D. In FIG. 7, the distribution of electric field vectors and potentials is shown when potential of the latent image in the half tone portion H is −530 V, the potential of the latent image in the solid portion D is −250 V and the potential of the opposed developing sleeve 3 is −580 V. A diameter of the developing sleeve is selected to 20 mm and a diameter of the photosensitive drum is selected to 30 mm, and moving directions of the surfaces of the developing sleeve 3 and the photosensitive drum 1 are shown by the arrows "b" and "a", respectively. In FIG. 7, observing directions of the electric field vectors generated from the developing sleeve 3, the electric field is directed toward the solid portion D to avoid the border portion G, and the electric field goes around from the half tone portion H to the solid portion D. That is to say, the toner leaving the developing sleeve 3 is transferred to the solid portion D along the direction of the electric field without flying onto the border portion at the half tone portion H side, and, even if the toner is transferred to the border portion at the half tone portion H side, in a border area W, a force acts on the toner to strip the toner from the photosensitive drum 1 and direct the toner toward the solid portion D.

FIG. 8A shows normal direction components Er (components in a normal direction) of the electric field vectors E on the photosensitive drum 1 around the border portion G. In the graph shown in FIG. 8A, the ordinate indicates an intensity of Er, and the direction of the electric field for attracting the toner toward the center of the photosensitive drum 1 is defined as a positive direction (+) and the direction of the electric field for stripping the toner from the photosensitive drum 1 is defined as a negative direction (−). In the solid portion D, the positive electric field is generated with a peak at the border portion G and, in the half tone portion H, the negative electric field for stripping the toner from the photosensitive drum 1 is generated.

In the border area W, it is known that a zone between the developing sleeve 3 and the photosensitive drum 1 (referred to as "S-D zone" hereinafter) is widened as the border portion G is moved. FIG. 8B shows change in normal direction components Er as the border portion G is moved. In FIG. 8B, $|\theta|$ is an absolute value of an angle between a line L1 connecting between the centers of the photosensitive drum 1 and the developing sleeve 3 and a line L2 connecting between the center of the photosensitive drum 1 and the border portion G, as shown in FIG. 7. When $|\theta|=0°$, the border portion G approaches the developing sleeve 3 to the most extent. As $|\theta|$ is increased, the negative zone is increased at the border portion of the half tone portion H side and the border area W is gradually widened (W1→W2→W3) accordingly. When $|\theta|=8°$, the value of the border area W3 becomes about 1 mm, and, thus, at both ends of the developing nip, the force for stripping the toner is generated at the border portion of the half tone portion H side through about 1 mm.

Thus, when the border portion G enters into the developing nip, as shown by the arrows in FIG. 9, the toner particles on the developing sleeve 3 are attracted toward the border portion of the solid portion D side before developing the border portion of the half tone portion H side, with the result that, when the border portion G reaches the center of the developing nip where the border area W becomes minimum, the toner contributing to the development is greatly reduced on the developing sleeve, thereby not developing the border portion G adequately. Further, even after the border portion G is passed through the center of the developing nip, since the force for stripping the toner is increased at the border portion of the half tone portion H side, a large amount of toner is returned to the developing sleeve 3 from the border portion of the half tone portion H side. As a result, a white void is generated in the border portion of the half tone portion H side. Such a phenomenon makes formation of a good image difficult, thereby deteriorating image quality.

SUMMARY OF THE INVENTION

An object of the present invention is to provide an image forming method in which a white void is prevented from being generated between adjacent images.

Another object of the present invention is to provide an image forming method in which images having different contrast can be positioned adjacent to each other.

A further object of the present invention is to provide an image forming method comprising the steps of charging a photosensitive member, forming an electrostatic latent image on the charged photosensitive member by image exposure, providing a non-expose area in an image border portion when images having different contrast are formed adjacent to each other, and developing the electrostatic latent image on the photosensitive member.

The other objects of the present invention will be apparent from the following detailed explanation of the invention.

BRIEF DESCRIPTION OF THE DRAWINGS

FIGS. 3A, 3B and 3C are views showing concrete examples of image data, for explaining the image treatment at the border portion, according to the first embodiment;

FIG. 9 is a view for explaining movement of toner particles at the image border portion in the prior art;

DETAILED DESCRIPTION OF THE PREFERRED EMBODIMENTS

The present invention will now be explained in connection with embodiments thereof with reference to the accompanying drawings.

First of all, a first embodiment of the present invention will be explained with reference to FIGS. 1, 2, 3A to 3C and 4.

Figure 1:
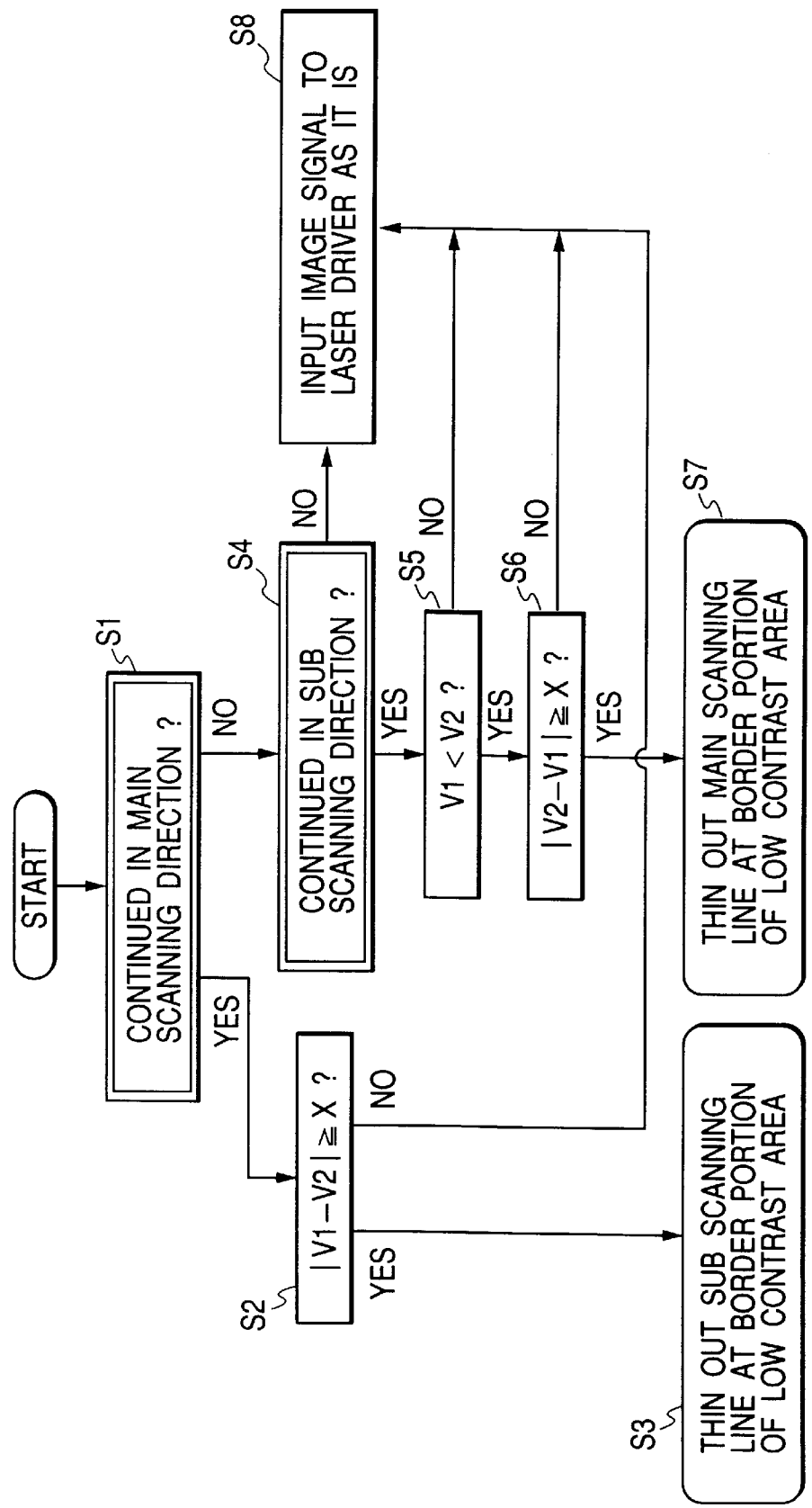
FIG. 1 is a flowchart for explaining image treatment at a border portion, according to a first embodiment of the present invention.
Figure 2:
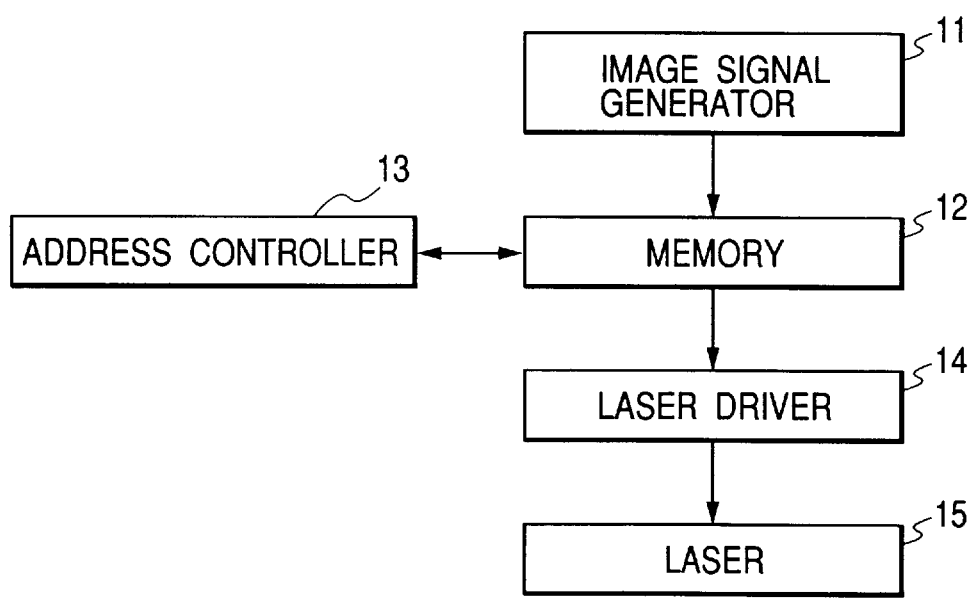
FIG. 2 is a block diagram of an address controller and therearound, according to the first embodiment.
Figure 4:
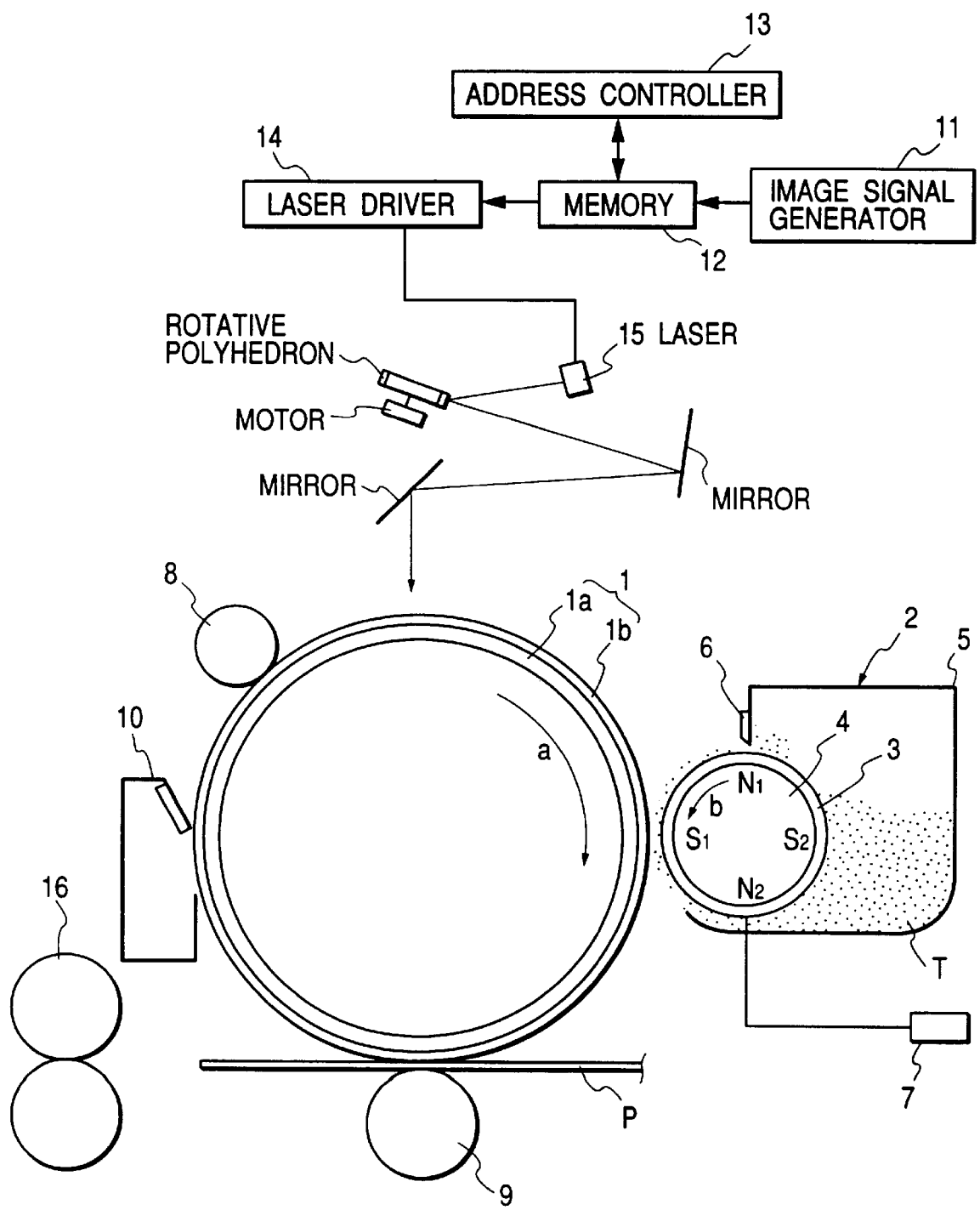
FIG. 4 is a schematic constructional view of an image forming apparatus according to the first embodiment.

FIG. 1 is a flowchart for judging contrast difference between successive images, effected by a memory 12 and an address controller 13 shown in FIG. 2, FIG. 2 is a block diagram showing image signal generation through laser, FIGS. 3A to 3C are views showing the image treatment at the border portion, according to the first embodiment, and FIG. 4 is a schematic constructional view of an image forming apparatus incorporating devices shown in FIGS. 1 and 2.

Now, a schematic construction of the image forming apparatus will be described with reference to FIG. 4. The image forming apparatus shown in FIG. 4 has a drum-shaped electrophotographic photosensitive member 1 (referred to as "photosensitive drum" hereinafter) as an image bearing member. The photosensitive drum 1 has a conductive drum substrate $1a$ and a photosensitive layer $1b$ (fully described later) coated on the drum substrate and is rotated at a predetermined process speed in a direction shown by the arrow a by a drive member (not shown).

Around the photosensitive member 1, there are disposed a first charger 8, an exposure means having laser 15, a developing device 2, a transfer roller (transferring device) 9 and a cleaning device 10 in order along a rotational direction of the photosensitive drum. Further, a fixing device 16 is disposed at a downstream side (left side in FIG. 4) of the photosensitive drum 1 in a conveying direction of a transfer material P.

In the developing device 2, a cylindrical nonmagnetic developing sleeve 3 is used as a toner bearing member, and one-component magnetic toner T contained in a toner container 5 is held on the developing sleeve 3 by a magnetic force of a magnet roller 4 fixed within the developing sleeve. By rotating the developing sleeve 3 in a direction shown by the arrow b in FIG. 4, the magnetic toner T is moved, and a thin toner layer is formed on the developing sleeve by a concentrated magnetic field generated between a magnetic blade 6 and a magnetic pole N1 of the magnet roller 4. The developing sleeve 3 on which the thin toner layer T was formed is opposed to a photosensitive drum 1 with a gap of 50 to 500 $\mu$m. Since a developing bias obtained by overlapping a DC voltage with an AC voltage is applied between the developing sleeve 3 and the photosensitive drum 1 from a bias power source 7, the toner T is flying toward and adhered to the electrostatic latent image on the photosensitive drum 1, thereby effecting so-called jumping development.

In FIGS. 4 and 2, an image signal generator 11 (for example, host computer, an image generator or an image reader) serves as a means for developing image data into a pixel matrix having a predetermined resolving power, and image information from the image signal generator 11 is sent to a memory 12. The image information sent to the memory 12 is sent to an address controller (image processing means) 13 acting as a means for judging contrast difference and for reducing an exposure amount, where contrast differences between successive images in main and subscanning directions are recognized. If it is judged that there is contrast difference having a predetermined value, the data in the memory 12 is treated so that a nonexposure area is formed in an image having lower contrast at a border portion between the images.

Explaining such treatments by using the flowchart of FIG. 1, the image information from the image signal generator 11 is inputted to the address controller 13, where, first of all, a direction along which the images are adjacent to each other with respect to the rotational direction (direction of arrow a) of the photosensitive drum 1 is determined (step S1). If the images are adjacent to each other along the main scanning direction, it is judged whether there is contrast difference X having a predetermined value or more between voltages V1 and V2 of the adjacent images by means of a contrast difference judging circuit of the address controller 13 (step S2). If $|V1-V2| \geq X$, a treatment for thinning out subscanning lines (lines in the subscanning direction) at a low contrast side border portion is performed (step S3). On the other hand, if $|V1-V2| < X$, the image signal is inputted to a laser driver 14 as it is (step S8). In the steps S1 and S4, if it is judged that the images are adjacent to each other along the subscanning direction, the image contrasts are set to V1 and V2 in order with respect to the rotational direction of the photosensitive drum 1. And, if it is judged as V1<V2 (step S5) and $|V2-V1| \geq X$ (step S6), a treatment for thinning main scanning lines (lines in the main scanning direction) at V1 side (low contrast side) of the border portion is performed (step S7).

For example, as shown in FIG. 3A, if the image information outputted from the image signal generator 11 includes a preceding low contrast image adjacent to a succeeding high contrast image in the subscanning direction, as shown in FIG. 3B, the data in the memory 12 is treated by the address controller 13 so that some of the main scanning lines are thinned out at the low contrast side of the border portion to form the nonexposure area. Incidentally, in the illustrated embodiment, image development with 400 dots/inch is used as a reference, and FIG. 3B shows a condition that one line is thinned out at the border portion in the main scanning direction. Thus, the nonexposure area having a width of about 180 $\mu$m is formed.

Next, an image forming operation of the image forming apparatus will be explained with reference to FIG. 4. The image forming apparatus according to the first embodiment is an image forming apparatus in which a laser beam is used as a light source and a drum-shaped electrophotographic photosensitive member (photosensitive drum) 1 is used as an image bearing member. The photosensitive drum is constituted by a conductive drum substrate, and a photosensitive layer 1b by coating or depositing, on the drum substrate, material mixing and dispersing resin and metallic photo-semiconductor such as amorphous silicone, zinc oxide or cadmium sulfide, or, organic photo-semiconductor such as phthalocyanine or polyvinylcarbazole.

The photosensitive drum 1 is rotated at a predetermined process speed in a direction shown by the arrow a, and the surface of the photosensitive drum 1 is uniformly charged with -700 V by the first charger 8.

Figure 10:
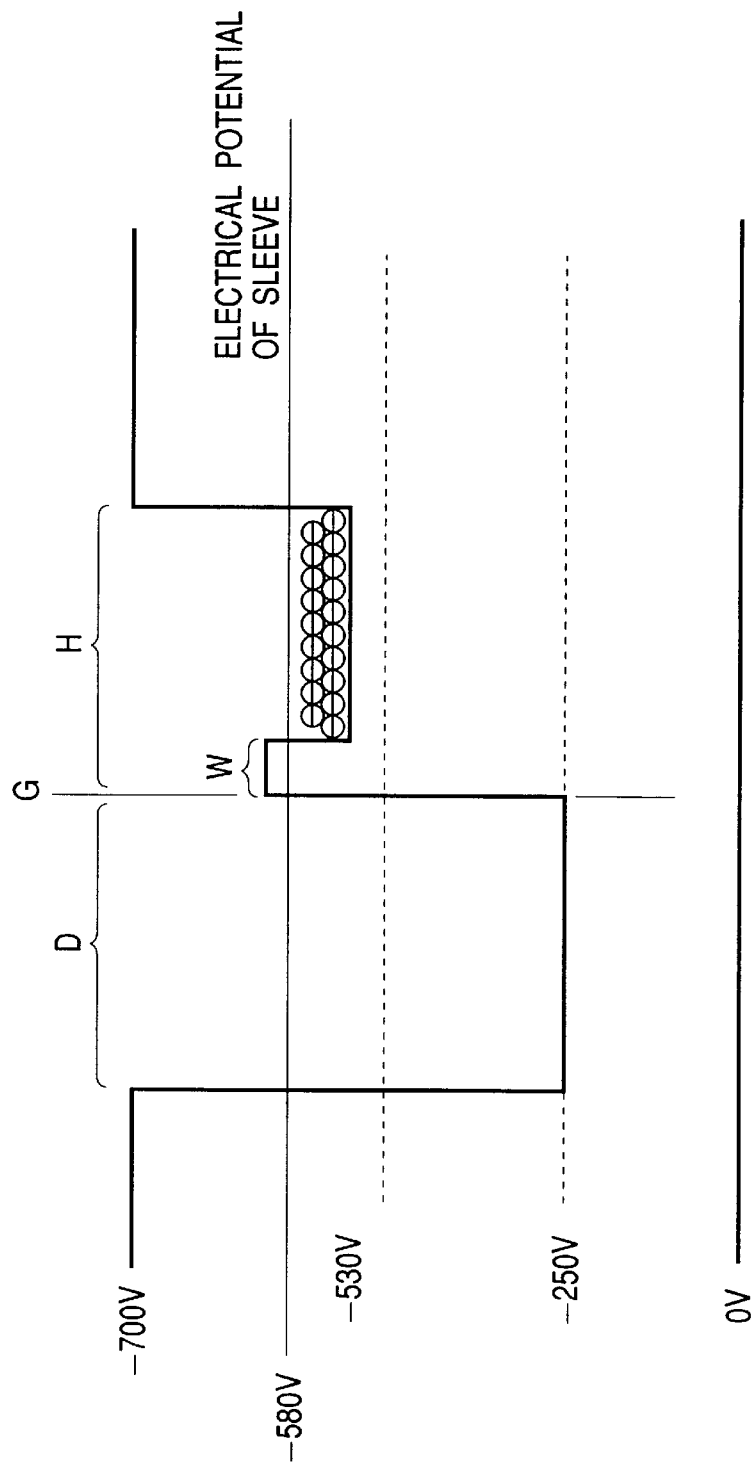
FIG. 10 is a view for explaining a potential pattern at an image border portion, according to the first embodiment.

Then, the above-mentioned treatment is effected by the address controller 13, and, on the basis of the image data, image exposure is effected by the laser driver 14 with respect to the surface of the photosensitive drum 1, thereby forming a latent image pattern. FIG. 10 schematically shows a potential pattern in this case. The magnitude of the potential is determined by the sensitivity of the photosensitive layer 1b regarding light and an exposure amount. In the illustrated embodiment, the exposure is effected so that surface potential of the solid portion D becomes -250 V and surface potential of the half tone portion H becomes -530 V, with the result that the nonexposure area of the border portion G is weakened by both opposite potentials to have a potential of about -600 V. By the "wall" of the potential formed at the border area W of the half tone portion H side in this way, since the amount of the electric field going around from the adjacent image are is reduced, the toner is not attracted to the succeeding image area.

Figure 11:
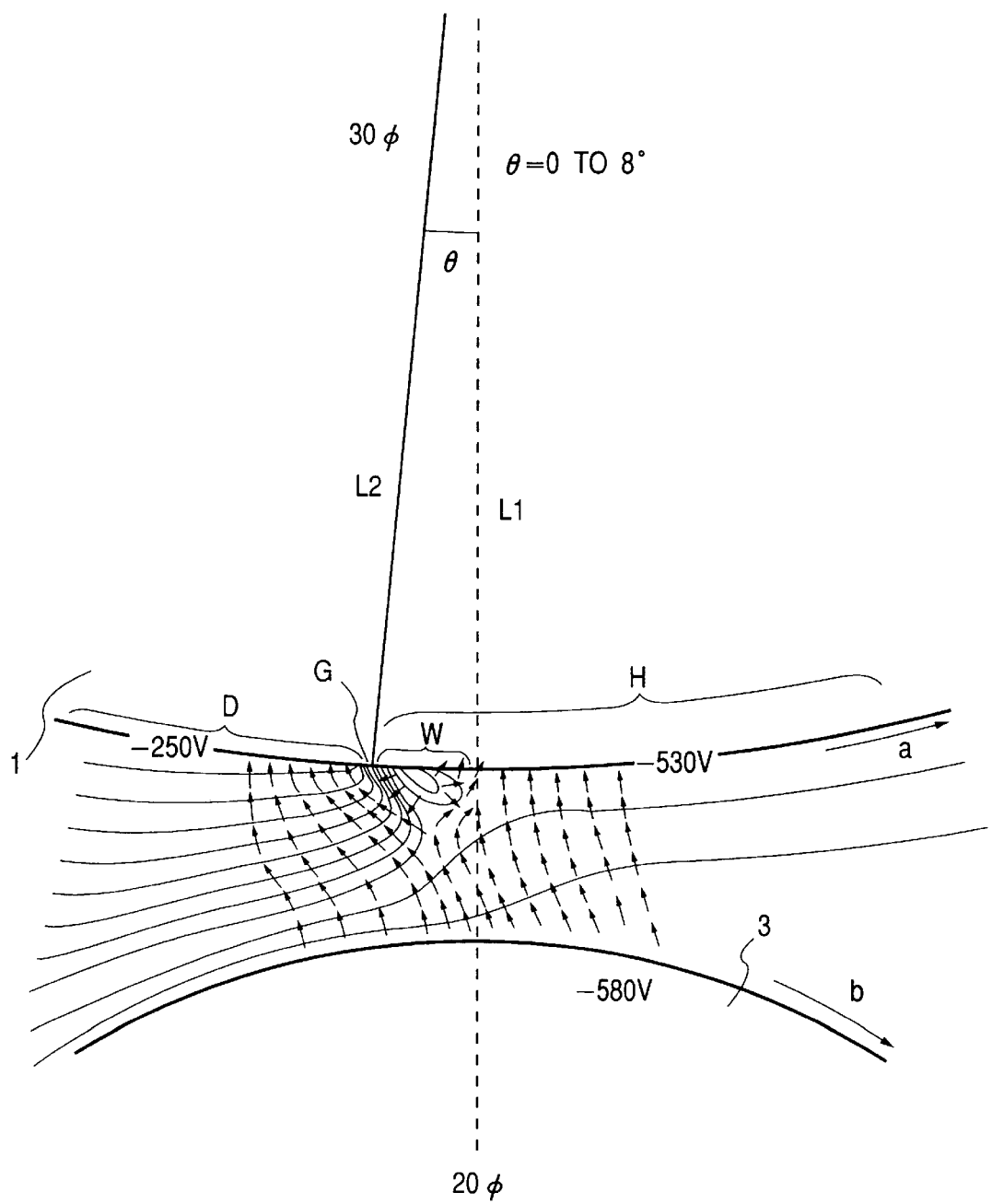
FIG. 11 is a view showing the distribution of the electric field vectors and potentials at the image border portion, according to the first embodiment.
Figure 12:
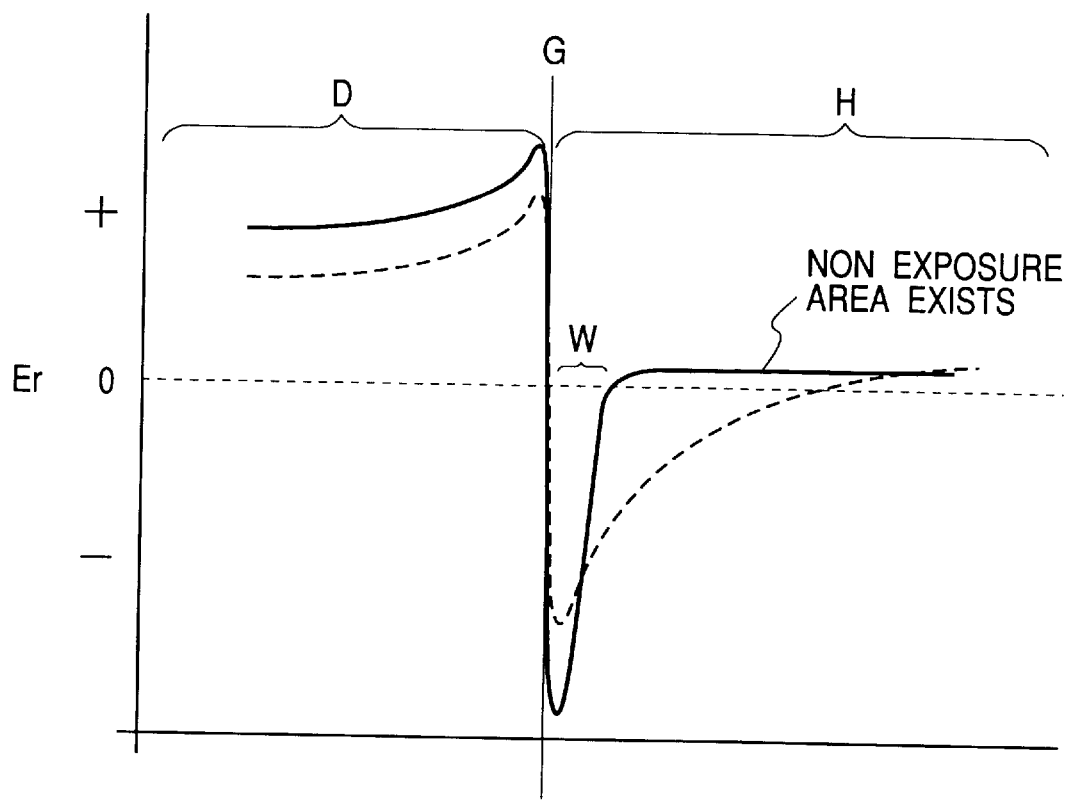
FIG. 12 is a view showing the normal direction components of the electric field vectors on a photosensitive drum at the image border portion, according to the first embodiment.

FIG. 11 shows distribution of the electric field vectors and the potentials at the border portion G. It can be seen that extension of the potential going around from the solid portion D is suppressed by the nonexposure portion of the border area W. FIG. 12 shows normal direction components Er about the border portion G in this case. Comparing this with the case where the nonexposure portion is not formed, the negative electric field zone for stripping the toner from the photosensitive drum 1 is decreased, and, thus, the border area W is decreased accordingly.

Of course, although the toner is not adhered to the nonexposure portion to create a white zone, when the image is developed with 400 dots/inch as mentioned above, even if the nonexposure area corresponding on line is formed in the main scanning direction, such a white zone is not noticeable visually.

Then, as shown in FIG. 4, the latent image is conveyed to the developing device (developing means) 2 opposed to the photosensitive drum. In this case, the one-component toner T (from the toner container 5) is held on the cylindrical nonmagnetic developing sleeve (toner bearing member) 3 by the magnetic force of the magnet roller 4 fixed within the developing sleeve. By rotating the nonmagnetic developing sleeve 3 in a direction shown by the arrow b in FIG. 4, the magnetic toner T is moved, and the thin toner layer is formed on the developing sleeve by the concentrated magnetic field generated between the magnetic blade 6 and the magnetic pole N1 of the magnet roller 4. The developing bias obtained by overlapping DC voltage of -580 V with AC voltage of 1.6 KV is applied to the developing sleeve 3 from the bias power source 7 to generate an electric field, with the result that the toner T is flying toward and adhered to the electrostatic latent image on the photosensitive drum 1 spaced apart from the sleeve by 300 $\mu$m, thereby forming a toner image. The toner image formed on the photosensitive drum 1 in this way is transferred onto the transfer material P by the transfer roller (transfer means) 9, and, thereafter, the toner image is fixed to the transfer material P by the fixing device 16.

After transferring the toner image, residual toner remaining on the photosensitive drum 1 is removed by the cleaning means 10 having a cleaning blade or a fur brush, thereby preparing for the next image formation.

Next, a second embodiment of the present invention will be explained.

The pattern of the nonexposure area or portion of the present invention is not limited to that shown in the above-mentioned first embodiment, but, for example, a pattern as shown in FIG. 3C is also effective. As is in the first embodiment, after the direction along which the images are adjacent to each other and the contrast difference are judged in the address controller 13, the nonexposure portion is formed at the low contrast side of the border portion, and, then, the image treatment in which the contrast adjacent to the nonexposure portion is increased is performed, thereby preventing the white void.

Figure 13:
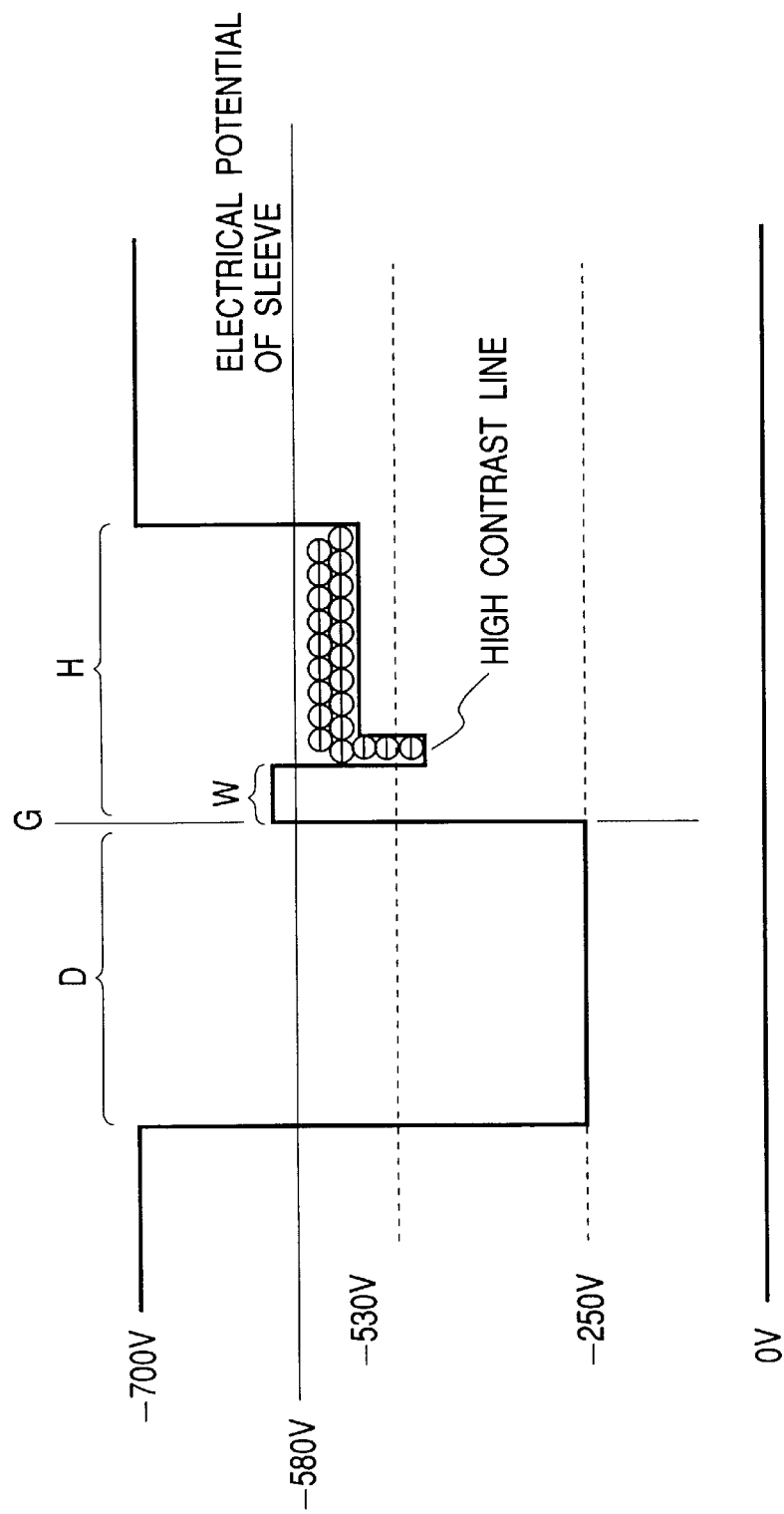
FIG. 13 is a view for explaining a potential pattern at an image border portion, according to a second embodiment of the present invention.
Figure 14:
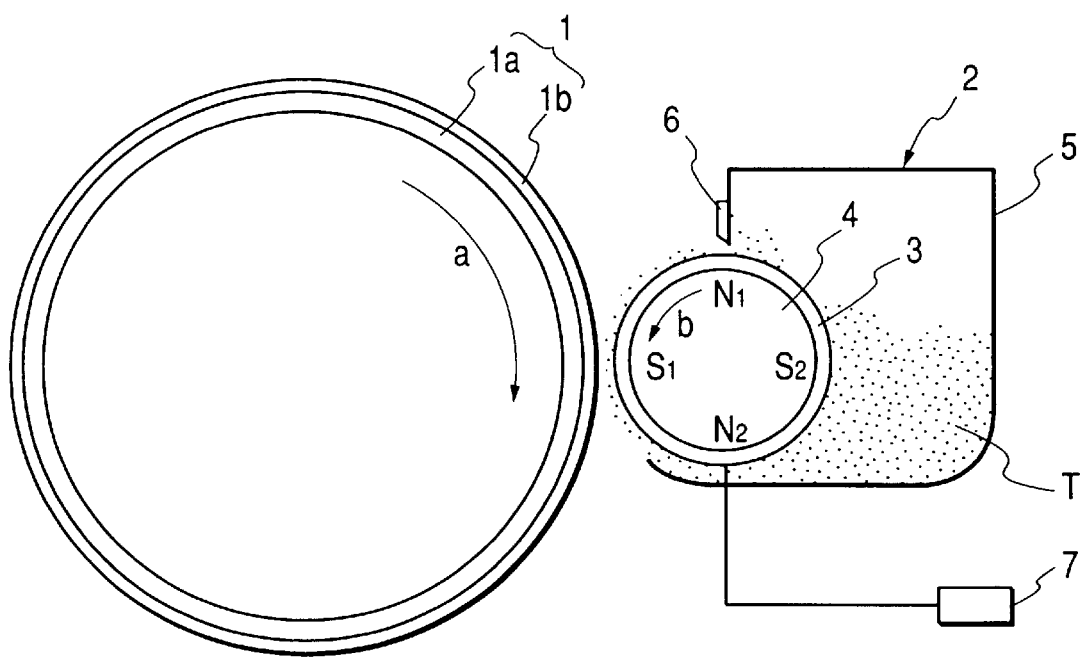
FIG. 14 is a schematic constructional view of a conventional developing device of noncontact type.

FIG. 13 shows a potential pattern in this case. By providing a high contrast line after the nonexposure line, since the going-around of the electric field can be prevented and the toner can be adhered by the low contrast side of the border portion, the white void can be prevented more effectively.

While the present invention has been explained in connection with embodiments thereof, the present invention is not limited to such embodiments, but, various alterations and modifications can be effected within the scope of the invention.

What is claimed is:

1. An image forming method comprising the steps of:

charging a photosensitive member;

forming an electrostatic image on said charged photosensitive member by image exposure;

providing a nonexposure area in an image border portion when images having different contrast are formed adjacent to each other; and developing the electrostatic image on said photosensitive member.

2. An image forming method according to claim 1, wherein, in said step of developing the electrostatic image, reverse development for developing a low potential portion of said photosensitive member is effected, and the nonexposure area is formed at an edge portion of a low contrast area.

3. An image forming method according to claim 1, further comprising a step of judging whether or not the contrast difference between the adjacent images is more than a predetermined value, and wherein, only when the contrast difference is more than the predetermined value, the nonexposure area is formed at the image border portion.

4. An image forming method according to claim 3, further comprising a step of determining a direction along which the images are adjacent to each other, and wherein, if the images are adjacent to each other in a subscanning direction, the nonexposure area is formed when the contrast of a downstream image in the subscanning direction is greater than the contrast of an upstream image by a predetermined value or more.

5. An image forming method according to claim 1, wherein a width of the nonexposure area is 200 $\mu$m or less.

6. An image forming method according to claim 1, wherein a width of the nonexposure area corresponds to one pixel.

7. An image forming method according to claim 1, further comprising a step of increasing contrast of a portion of a low contrast area adjacent to the nonexposure area.

8. An image forming method according to claim 7, wherein the portion that the contrast is increased corresponds to one pixel.

* * * * *

UNITED STATES PATENT AND TRADEMARK OFFICE
CERTIFICATE OF CORRECTION

PATENT NO. : 5,835,819

DATED : November 10, 1998

INVENTOR(S): TAKESHI YAMAMOTO

It is certified that error appears in the above-identified patent and that said Letters Patent is hereby corrected as shown below:

COVER PAGE [54] TITLE,
"NON-EXPOSURE" should read --NONEXPOSURE--.

COLUMN 1,
Title, "NON-EXPOSURE" should read --NONEXPOSURE--.

COLUMN 3,
Line 30, "non-expose" should read --nonexposure--.

COLUMN 4,
Line 8, "constructural" should read --constructional--.

COLUMN 6,
Line 17, "image are" should read --image area--.

COLUMN 8,
Line 24, "An" should read --¶ An--; and
Line 28, "that" should read --in which--.

FIGURE 1,
"SUB SCANNING" (both occurrences" should read
--SUBSCANNING--.

UNITED STATES PATENT AND TRADEMARK OFFICE
CERTIFICATE OF CORRECTION

PATENT NO. : 5,835,819

DATED : November 10, 1998

INVENTOR(S): TAKESHI YAMAMOTO

Page 2 of 2

It is certified that error appears in the above-identified patent and that said Letters Patent is hereby corrected as shown below:

<u>FIGURE 3A</u>,
"SUB SCANNING" should read --SUBSCANNING--.

<u>FIGURE 3B</u>,
"EXPOSE" should read --EXPOSURE--.

<u>FIGURE 3C</u>,
"EXPOSE" --EXPOSURE--.

Figure 5:
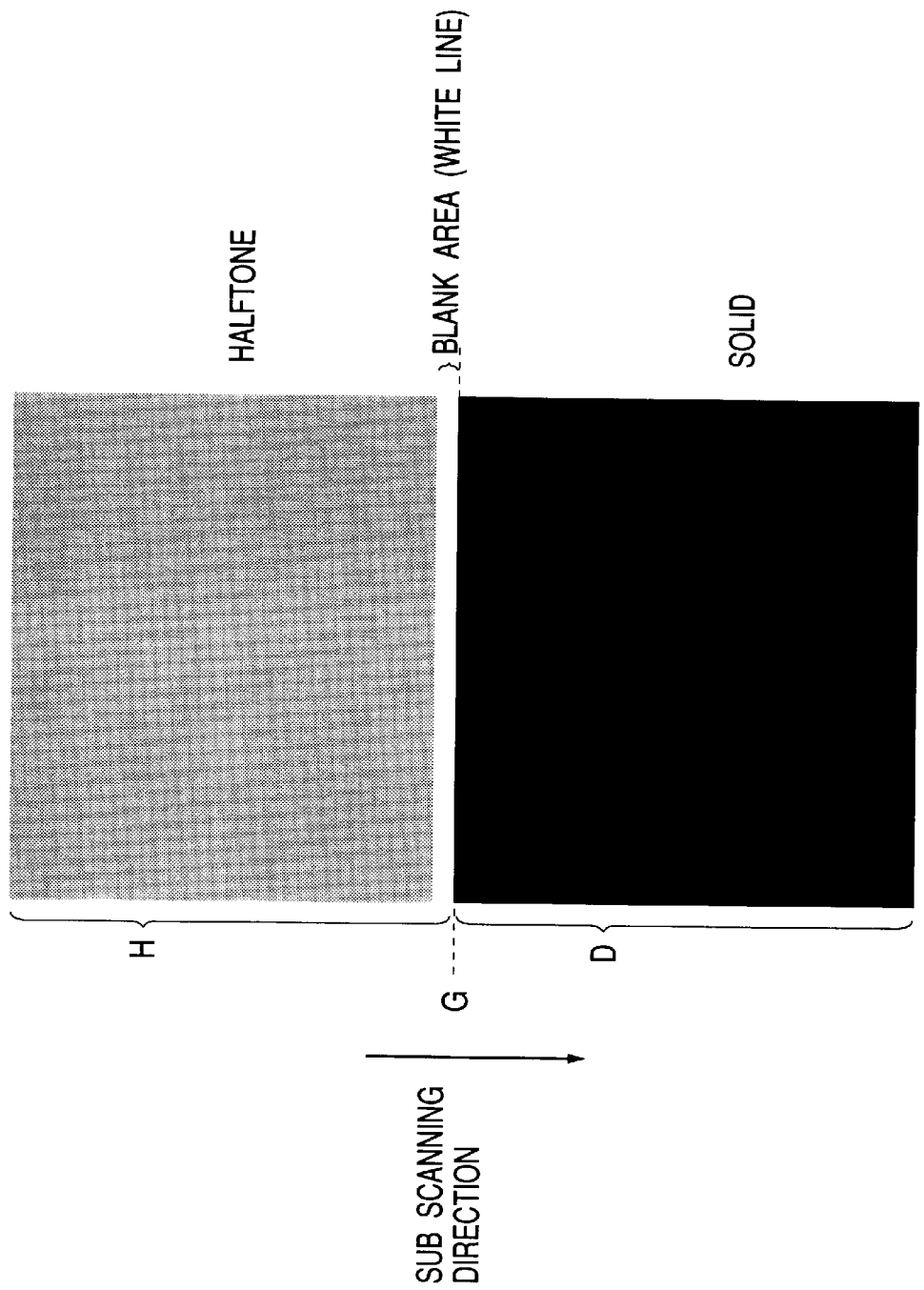
FIG. 5 is a view for explaining an image condition at an image border portion in the prior art.
Figure 6:
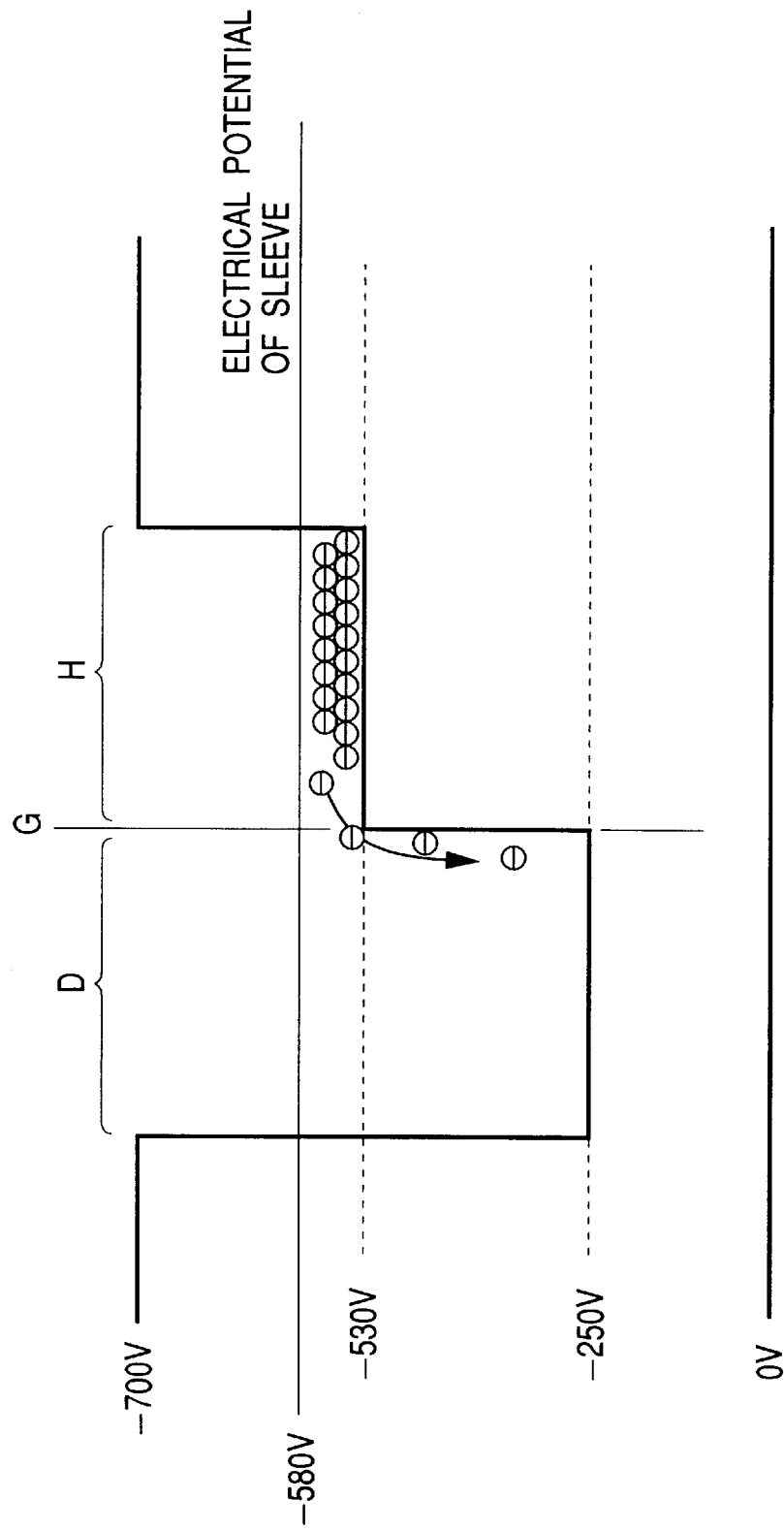
FIG. 6 is a view for explaining a potential pattern at the image border portion in the prior art.
Figure 7:
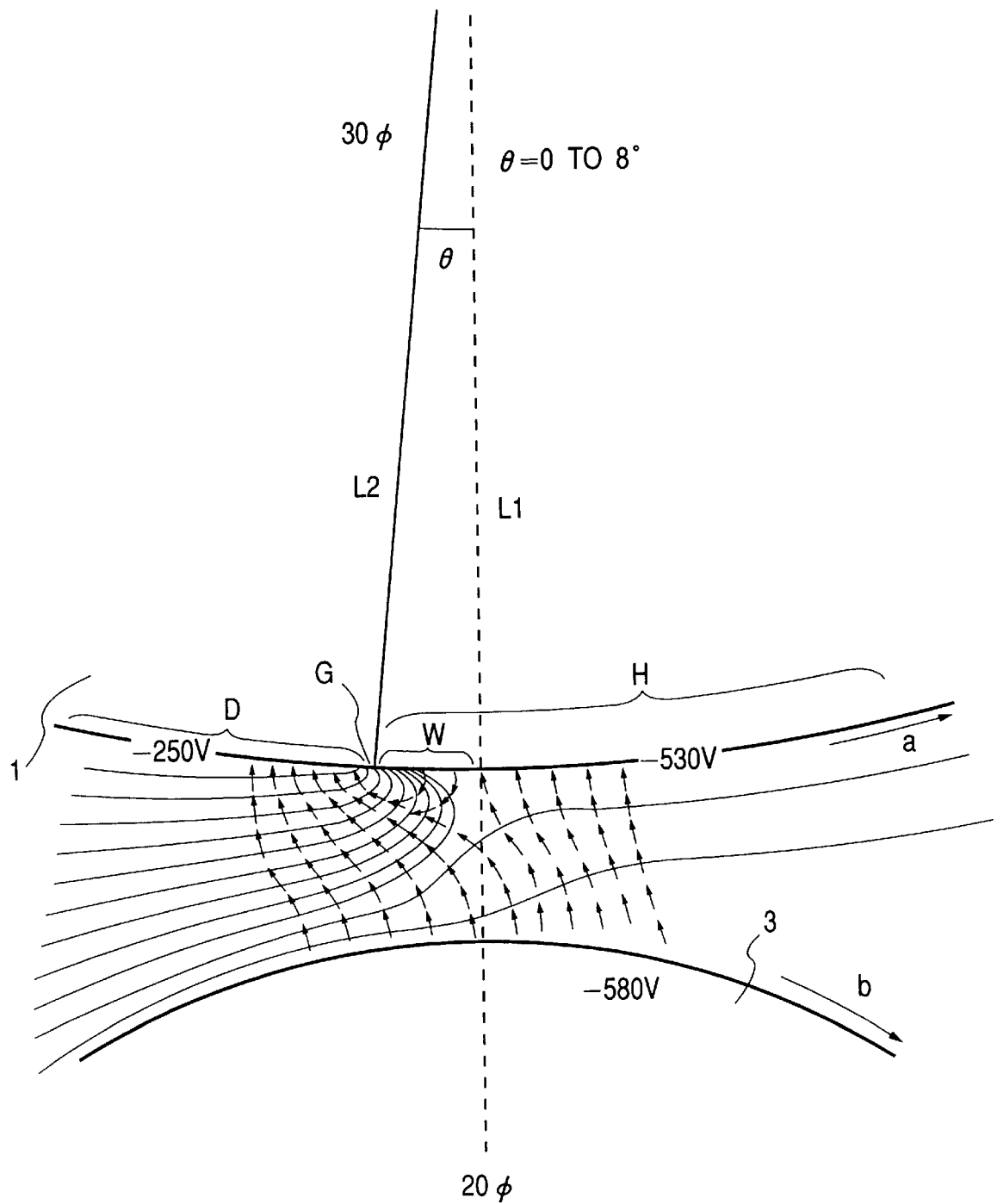
FIG. 7 is a view showing the distribution of electric field vectors and potentials at the image border portion in the prior art.
Figure 8A:
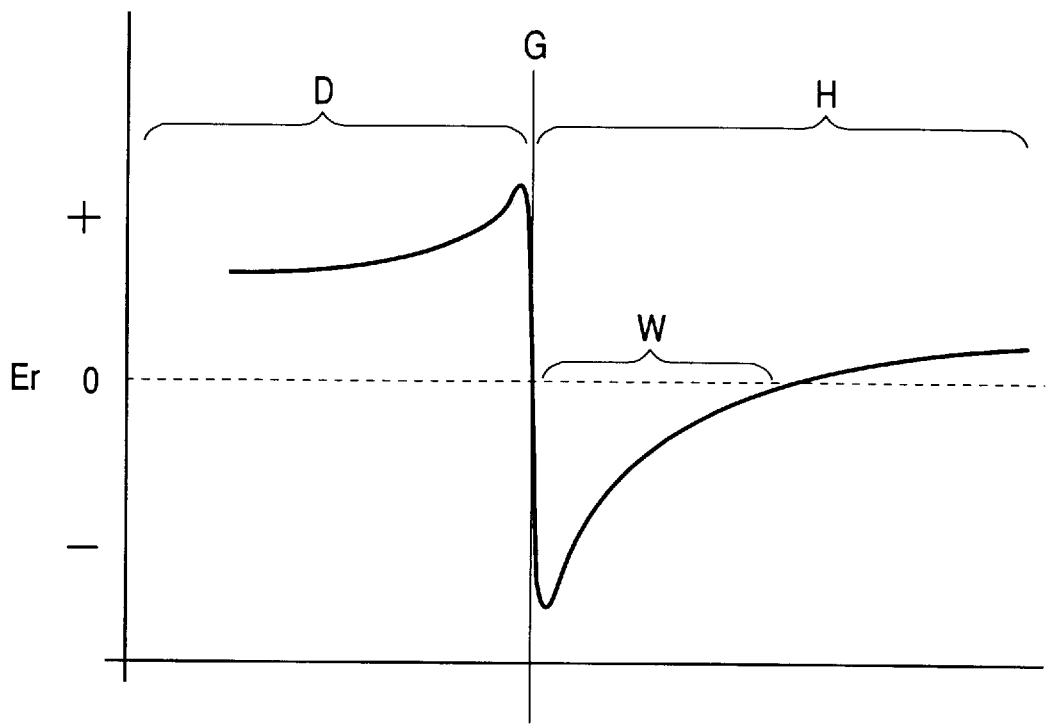
FIGS. 8A and 8B are views showing the normal direction components of electric field vectors on a photosensitive drum at the image border portion in the prior art.
Figure 8B:
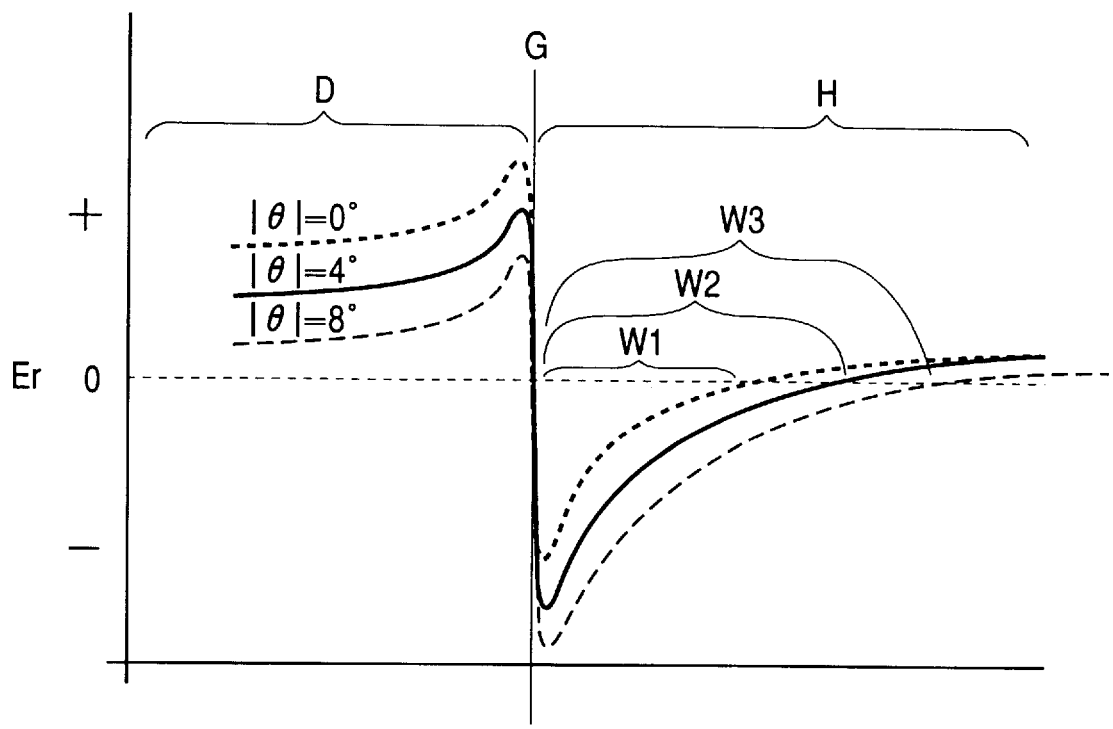

<u>FIGURE 5</u>,
"SUB SCANNING" should read --SUBSCANNING--.

<u>FIGURE 12</u>,
"NON EXPOSURE" should read --NONEXPOSURE--.

Signed and Sealed this

Thirty-first Day of August, 1999

Attest:

Q. TODD DICKINSON

*Attesting Officer*    *Acting Commissioner of Patents and Trademarks*